United States Patent
Kurz et al.

(10) Patent No.: US 10,597,066 B2
(45) Date of Patent: Mar. 24, 2020

(54) ENERGY ABSORPTION ELEMENT FOR A STEERING COLUMN OF A MOTOR VEHICLE AND STEERING COLUMN FOR A MOTOR VEHICLE

(71) Applicants: THYSSENKRUPP PRESTA AG, Eschen (LI); thyssenkrupp AG, Essen (DE)

(72) Inventors: Hannes Kurz, Feldkirch (AT); Werner Adelmann, Haag (CH); Matthias Nicolussi, Feldkirch (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 106 days.

(21) Appl. No.: 15/764,465

(22) PCT Filed: Sep. 21, 2016

(86) PCT No.: PCT/EP2016/072417
§ 371 (c)(1),
(2) Date: Mar. 29, 2018

(87) PCT Pub. No.: WO2017/055155
PCT Pub. Date: Apr. 6, 2017

(65) Prior Publication Data
US 2018/0281841 A1     Oct. 4, 2018

(30) Foreign Application Priority Data
Oct. 2, 2015 (DE) .................. 10 2015 219 086

(51) Int. Cl.
*B62D 1/19* (2006.01)
*F16F 7/12* (2006.01)
*B62D 1/187* (2006.01)

(52) U.S. Cl.
CPC ............. *B62D 1/195* (2013.01); *B62D 1/187* (2013.01); *F16F 7/123* (2013.01); *F16F 7/128* (2013.01)

(58) Field of Classification Search
CPC ........ B62D 1/195; B62D 1/187; B62D 1/192; B62D 1/19; B62D 1/197; F16F 7/123; F16F 7/128; F16F 7/12
(Continued)

(56) References Cited

U.S. PATENT DOCUMENTS

| 6,505,856 B1 | 1/2003 | Joehr |
| 2005/0104355 A1 | 5/2005 | Ishida |

(Continued)

FOREIGN PATENT DOCUMENTS

| CN | 1301223 A | 6/2001 |
| CN | 1642802 A | 7/2005 |

(Continued)

OTHER PUBLICATIONS

English Translation of International Search Report issued in PCT/EP2016/072417, dated Nov. 30, 2016 (mailed Dec. 13, 2016).

*Primary Examiner* — Keith J Frisby
(74) *Attorney, Agent, or Firm* — thyssenkrupp North America, Inc.

(57) ABSTRACT

An energy absorption element for a steering column of a motor vehicle may comprise a deformation element, a first fastening element, and a second fastening element. The deformation element may be connected to the first fastening element and to the second fastening element and is arranged in a force flux with respect to a force that can be exerted on the first fastening element relative to the second fastening element. To achieve improved security against damage due to unauthorized use or inadvertent damage and, in the process, requiring little outlay on manufacturing and instal- (Continued)

lation, a predetermined breaking element may be connected to the first and second fastening elements parallel to the deformation element in the force flux.

8 Claims, 4 Drawing Sheets

(58) Field of Classification Search
USPC .......................................................... 280/777
See application file for complete search history.

(56) References Cited

U.S. PATENT DOCUMENTS

| | | |
|---|---|---|
| 2006/0214411 A1 | 9/2006 | Ikegaya |
| 2008/0272583 A1* | 11/2008 | Lopez .................... B62D 1/195 280/777 |
| 2010/0018340 A1 | 1/2010 | Schnitzer |
| 2010/0330392 A1 | 12/2010 | Ono |
| 2011/0157015 A1 | 6/2011 | Ye |
| 2013/0054094 A1 | 2/2013 | Elsensohn |
| 2013/0068553 A1 | 3/2013 | Klukowski |
| 2014/0020502 A1 | 1/2014 | Schnitzer |
| 2016/0244015 A1* | 8/2016 | Dubay .................... B60R 21/02 |

FOREIGN PATENT DOCUMENTS

| | | | |
|---|---|---|---|
| DE | 1962183 A | 6/1970 | |
| DE | 19637176 A | 3/1997 | |
| DE | 102004041086 A1 * | 3/2006 | ............. B62D 1/192 |
| DE | 102012111890 B | 12/2013 | |
| DE | 102013104958 B | 7/2014 | |
| DE | 102013109931 A | 3/2015 | |
| DE | 102014104350 B | 5/2015 | |
| EP | 2353966 A | 8/2011 | |
| JP | H10-217981 A * | 8/1998 | |
| JP | H10-217981 A | 8/1998 | |
| JP | H1134884 A | 2/1999 | |
| JP | 2008006933 A * | 1/2008 | |
| JP | 2008062876 A | 3/2008 | |

* cited by examiner

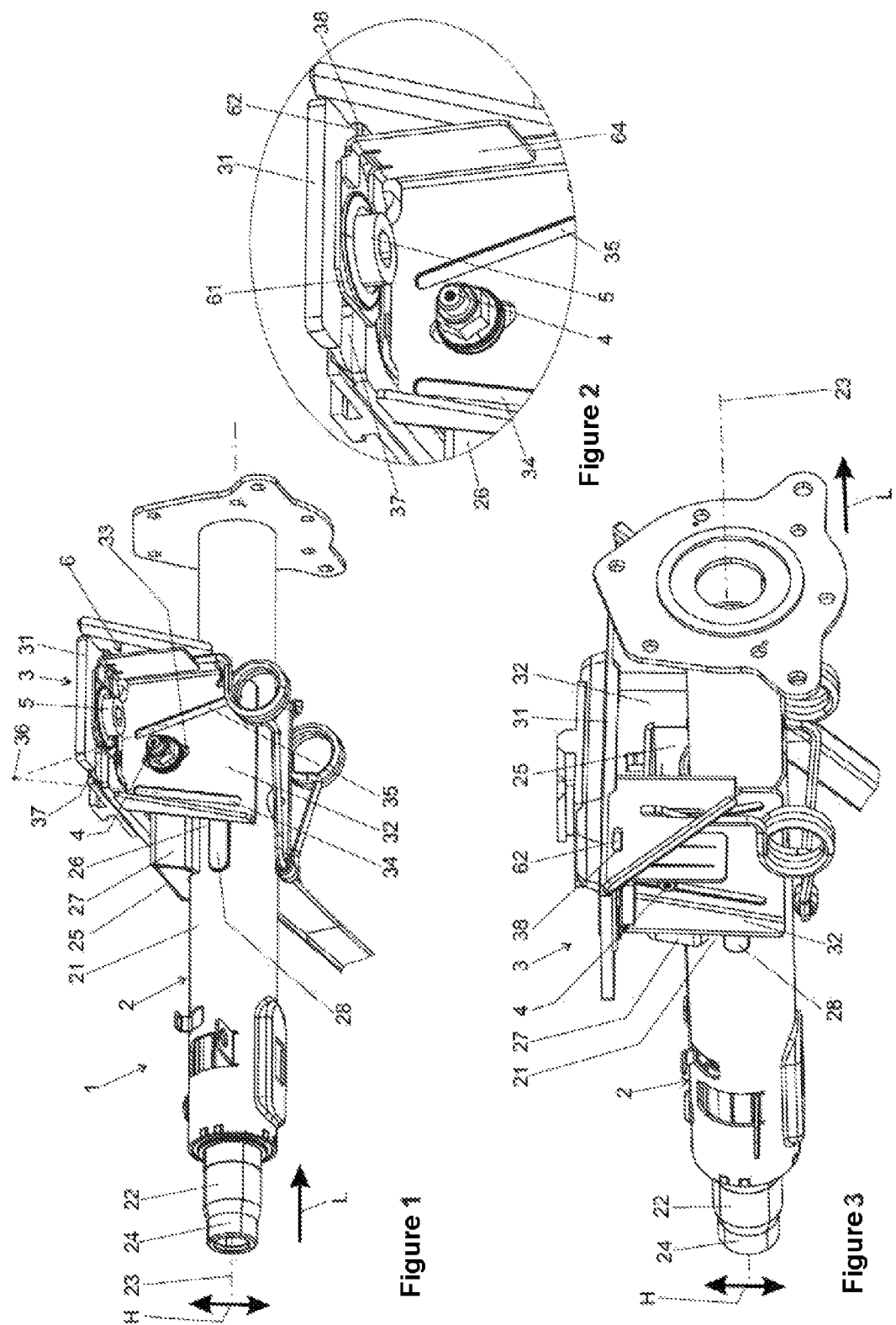

US 10,597,066 B2

ENERGY ABSORPTION ELEMENT FOR A STEERING COLUMN OF A MOTOR VEHICLE AND STEERING COLUMN FOR A MOTOR VEHICLE

CROSS REFERENCE TO RELATED APPLICATIONS

This application is a U.S. National Stage Entry of International Patent Application Serial Number PCT/EP2016/072417, filed Sep. 21, 2016, which claims priority to German Patent Application No. DE 10 2015 219 086.2, filed Oct. 2, 2015, the entire contents of both of which are incorporated herein by reference.

FIELD

The present disclosure generally relates to steering columns, including energy absorption elements for steering columns of motor vehicles.

BACKGROUND

Steering columns are known which, in order to increase the occupant safety in the event of a vehicle collision, what is referred to as a crash situation, comprise what is referred to as a crash device or a crash system. A crash device of this type makes provision for the adjusting unit, to which the steering wheel is attached on the driver's side, to be displaceable forward in the longitudinal direction, i.e. in the direction of travel, relative to the body-mounted supporting unit of the steering column. If the driver's body impacts at a high speed against the steering wheel during a head-on collision, a relatively large force is exerted on the steering wheel in the longitudinal direction, said force exceeding a limit value which only occurs in a crash situation. In order to reduce the risk of injury in this case by means of a controlled and as uniform as possible a retardation of the body striking against the steering wheel, it is known to couple an energy absorption device between the supporting unit and the adjusting unit. Said energy absorption device comprises an energy absorption element which is fastened via first and second fastening elements firstly to a body-mounted component of a supporting device, for example a bracket unit or a holding clamp held on the bracket unit, and secondly to a component which is displaceable together with the steering wheel relative to the body in the crash situation, for example the adjusting unit, a sleeve unit or the like. The fastening elements are connected to each other via at least one deformation element which is located in the force flux between the fastening elements during the relative movement of the fastening elements. As a result, in the crash situation, the energy which is introduced over the displacement distance of the relative movement is converted into a defined plastic deformation of the deformation element, and therefore a controlled, moderated retardation takes place.

In the prior art, an energy absorption device for a steering column is described in DE 10 2013 104 958 B3 which is taken as the basis of the generic type. The deformation element provided here is a bending tab which, in the crash situation, is continuously bent over the displacement distance between the sleeve unit of an adjusting unit and a holding unit and therefore ensures a moderated retardation by means of continuous energy absorption during the deformation of the bending tab. For energy absorption, DE 1 962 183 discloses an energy absorption device with a deformation element which is designed as a bending and tearing tab. This basically involves a bending tab which, during bending, is additionally severed along a defined tearing line from a support, as a result of which energy is additionally absorbed. The bending and tearing tab is likewise bent over continuously over the displacement distance during a relative movement of sleeve unit and holding unit.

An advantage of the known energy absorption devices is the energy absorption, which is uniform over the displacement distance, by the deformation element. However, it is disadvantageous that the deformation element may already be deformed outside the crash situation, for example due to an action of force due to unauthorized use on the steering wheel or an inadvertent excessive application of force when adjusting the steering column, and this may impair the effectiveness of the crash device in the crash situation. In order to prevent this, it has indeed already been proposed, for example in DE 196 37 176 A1, in addition to the frictional connection between the body and the steering column components which are displaceable relative thereto, to insert a capsule having tear-off pins which only tear off in the crash situation and only then release the force flux via the deformation element. However, the known arrangement is disadvantageous in that not only does the energy absorption element have to be provided and mounted together with its fastening elements, but in addition the capsule and the tear-off pins have to be manufactured, provided and mounted. This gives rise to a higher outlay on manufacturing, installation and costs than in the case of simple use of an energy absorption element of the type in question.

Thus a need exists for an energy absorption element that provides improved security against damage due to unauthorized use or inadvertent damage and, in the process, requires little outlay on manufacturing and installation. A need also exists for an improved steering column for a motor vehicle.

BRIEF DESCRIPTION OF THE FIGURES

FIG. 1 is a schematic perspective view of a steering column with an example energy absorption element.

FIG. 2 is a detailed view of the example steering column of FIG. 1. FIG. 3 is a schematic perspective view of the example steering column of FIG. 1.

DETAILED DESCRIPTION

Figure 4:
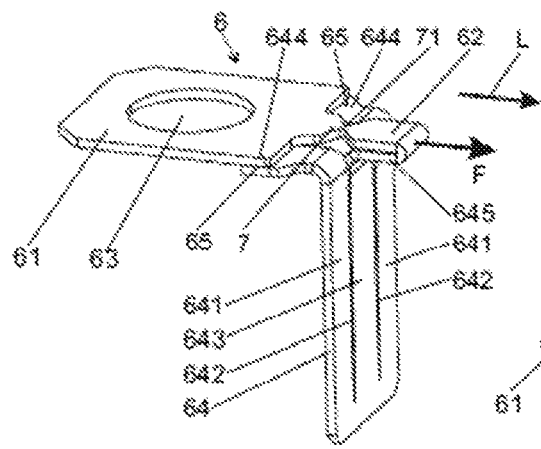
FIG. 4 is a schematic perspective view of an example energy absorption element in an inoperative state.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to energy absorption elements for steering columns of motor vehicles. In some examples, an energy absorption element may comprise at least one deformation element, a first fastening element, and a second fastening element. The deformation element may be connected to the first fastening element and to the second fastening element and may be arranged in a force flux with respect to a force that can be exerted on the first fastening element relative to the second fastening element. The present disclosure also generally relates to a steering column with such an energy absorption element.

In some examples, it is proposed that at least one predetermined breaking element is connected to the first and to the second fastening element parallel to the deformation element in the force flux.

To solve the aforementioned problem, it is proposed according to the invention that at least one predetermined breaking element is connected to the first and to the second fastening element parallel to the deformation element in the force flux.

As known per se, the energy absorption element has a deformation element which is arranged in such a manner that it is located in the force flux between the fastening elements. According to the invention, a predetermined breaking element, which forms a breakaway element, is additionally likewise arranged between the fastening elements. In contrast to the deformation element which, upon an application of force, is deformed continuously over a predetermined distance and therefore continuously over a period of time and, at the end of its deformation, continues to still connect the fastening elements to each other, when a limit value of the acting force, the limit force provided by the breaking force of the predetermined breaking element, is exceeded, the predetermined breaking element abruptly severs, and therefore the fastening elements are no longer connected to each other by the predetermined breaking element. When the limit force is exceeded, the separation by tearing off or breaking of the predetermined breaking element takes place virtually discontinuously, i.e. abruptly in time without a substantial previous stretching.

In the case of the invention, the deformation element and the predetermined breaking element are inserted parallel between the fastening elements in the force flux. As a result, a force acting on the fastening elements only causes the energy absorption element to be activated if the limit force is exceeded. The predetermined breaking element is then firstly severed and subsequently the application of force onto the deformation element is released. Below the threshold value of the force which is predetermined by the limit force of the predetermined breaking element, the fastening elements are held in position relative to each other by the predetermined breaking element, and therefore the deformation element cannot be deformed. As a result, it is ensured that, if the steering wheel is subjected to inadvertent loads or loads due to unauthorized use, which loads virtually always lie below the force occurring in the crash situation, the deformation element remains intact.

The invention has the particular advantage over the prior art that the deformation element and the predetermined breaking element are combined in the energy absorption element to form an integral component which can be attached with its two fastening elements to the components which are displaceable in relation to each other in the crash situation. As a result, the installation is as simple as in the case of the energy absorption elements which are known in the prior art and have only one deformation element, but the security level is higher here, namely as high as in the case of arrangements having separately mounted predetermined breaking elements. The outlay on production and installation is thereby reduced and at the same time the functionality improved.

An advantageous embodiment of the invention provides that the predetermined breaking element comprises a predetermined breaking point with a reduced breaking or tearing resistance in comparison to the remaining extent between the fastening elements. The predetermined breaking element extends, according to the invention, with its extent between the first and second fastening element. It can obtain its crucial property, when a threshold value of the force applied to the fastening elements, the limit force, is exceeded, by means of a predetermined breaking point which, at the planned separating point, constitutes a point of weakness which is introduced in a targeted manner and has a defined breaking or tearing resistance. In practice, the predetermined breaking point can be realized by a portion having a reduced material cross section in comparison to the rest of the extent of the predetermined breaking element, for example by an indentation or constriction, and therefore increased stresses prevail in this region in relation to other regions outside the predetermined breaking point when a force is admitted, and therefore the strength which can be tolerated by the material, for example the tensile strength, is exceeded and, consequently, a material failure occurs in the region of the predetermined breaking point. Alternatively or additionally, the predetermined breaking point can be realized by a portion having a reduced material strength, which can be produced, for example, in a predetermined breaking element composed of metal, such as, for example, steel or the like, by local thermal treatment, as a result of which breaking and tearing properties can be set in a targeted manner. Furthermore, it is conceivable to insert a portion of a different material into the predetermined breaking element, for example a portion composed of a plastics material into a predetermined breaking element manufactured from metal, in the region of the predetermined breaking point.

The limit force, at the exceeding of which the predetermined breaking element is separated, can be set independently of the force at which deformation of the deformation element occurs. In order to achieve a uniform energy absorption profile, the limit force can be predetermined by a suitable configuration of the predetermined breaking point, in that said limit force approximately corresponds to the triggering force of the deformation element, wherein it is advantageous for the limit force to be slightly greater than the triggering force. It is thereby ensured that the deformation element is actually deformed only after the predetermined breaking element is severed.

It can be realized in the invention that the first and second fastening element are arranged at a distance from each other in a longitudinal direction, wherein the deformation element and the predetermined breaking element are arranged between the first and second fastening element with respect to said longitudinal direction. The longitudinal direction can be the longitudinal direction of the steering column, which is given by the longitudinal axis of the steering spindle. In said longitudinal direction, the force acts on the energy absorption device via the fastening elements in the crash situation, i.e. the force flux runs in the longitudinal direction. The deformation element extends from the first to the second fastening element. According to the invention, the predetermined breaking element likewise connects the first fastening element to the second fastening element in the longitudinal direction. This realizes the parallel arrangement according to the invention. An advantage of this is that the deformation element and the predetermined breaking element can be realized in a compact constructional unit which overall comprises only two fastening elements for connection to the steering column and to the vehicle body. This arrangement is of benefit for a simplified installation.

The fastening elements can be designed, for example, as tabs and, for the connection to the components of steering column and body, which components are displaceable in relation to each other, can comprise fastening means, such as fastening openings or fastening projections, or interlocking holding elements or other holding elements. Accordingly, the installation of the energy absorption device on corresponding receptacles on the steering column and on the body-mounted components can be undertaken by means of screws, rivets or clamps, or by interlocking joining.

The deformation element is deformable in a continuously progressing manner over a predetermined deformation distance and, in the process, absorbs kinetic energy which the deformation element converts into deformation work. The deformation distance corresponds to the relative movement between the first and the second fastening element, wherein said relative movement is possible only if the predetermined breaking element is severed in the crash situation.

The deformation element can comprise a bending element, for example at least one bending wire, and/or a tearing tab and/or a bending and tearing tab. These are tried and tested and functionally reliable energy-absorbing arrangements which are known per se and are used as separate energy absorption elements in the prior art. Owing to the integration according to the invention with a predetermined breaking element, the operating reliability and functionality of said reliable components is further increased. Alternatively or additionally, it is conceivable and possible to use other energy absorption elements, which are known in the prior art, as deformation elements in the combination according to the invention, for example separating and/or deforming devices which, in the crash situation, convert introduced energy into plastic deformation.

In an advantageous embodiment of the invention, the energy absorption element comprises a basic body which is attached to the first fastening element, and a bending strip which is formed on the basic body and is connected to the second fastening element. The bending strip can be designed as a tearing tab which is connected to the basic body via at least one predetermined breaking line which is formed, for example, by a linear notch in the basic body and along which the tearing resistance is reduced in a targeted manner. In the crash situation, the fastening elements are moved relative to each other, wherein the bending strip is severed continuously from the basic body along the predetermined tearing line, as a result of which energy is absorbed. Associated therewith, the bending strip is bent over continuously in itself, as a result of which energy is likewise converted into plastic deformation. As a result, a high degree of efficiency is achieved with dimensions being small. The additional advantage brought about by the invention is that, by means of the configuration of the predetermined breaking element, reliable activation of the bending and tearing tab can take place without an undesirable deformation taking place outside the crash situation.

Alternatively, the bending strip can be designed as a pure bending tab which, in contrast to the previously described embodiment, is not connected to the basic body along the extent of the predetermined tearing lines, and therefore said bending tab is not severed during a relative movement of the fastening elements, but rather is merely bent over in itself.

In an advantageous development of the aforementioned embodiment, the second fastening element is formed on the bending strip, and the bending strip is guided further beyond the second fastening element than the predetermined breaking element as far as the first fastening element. As is basically known, the bending strip can be designed, for example, as a sheet-metal strip. The second fastening element can be formed on said strip-shaped bending element, for example in the form of a fastening opening, or as a chamfer, bent-over portion or projection for connection to a corresponding receptacle on a component of the steering column or of the body. Furthermore, the bending strip itself can be configured as a predetermined breaking element. For this purpose, the bending strip can be extended, specifically as far as the first fastening element. A predetermined breaking point can be formed here in the extent between the first and second fastening element, where the bending strip forms the predetermined breaking element, as described above. This gives rise to the particularly advantageous possibility of the energy absorption element being designed as a single-piece shaped part. For example, a bending and tearing tab, as known per se in the prior art, can be designed as a single-piece sheet-metal shaped part, wherein the bending tab is of extended design, and therefore it serves as a predetermined breaking element according to the invention.

It is advantageous that the energy absorption element is designed as a single-piece shaped part, specifically in particular as a sheet-metal shaped part which is produced from a single sheet-metal blank. Said sheet-metal blank can be economically produced as a punched part, into which the predetermined tearing lines are pressed, and which is chamfered, folded or plastically formed in some other way. The fastening elements can likewise be formed on the sheet-metal blank. The predetermined breaking element formed according to the invention parallel to the deformation element, for example a bending and tearing tab, can be formed, for example, by a notch or material weakening in the metal sheet. The bending and tearing tab and the predetermined breaking element can be connected parallel to each other by a connection to the respective fastening elements taking place by means of suitable joining techniques, for example by the predetermined breaking element or the deformation element being fixedly connected to one of the fastening elements by spot welding.

The invention furthermore relates to a steering column for a motor vehicle, comprising a supporting unit which is connectable to a body of a motor vehicle, and a holding unit which supports an adjusting unit with a steering spindle mounted rotatably therein and which is held by the supporting unit so as to be displaceable in a longitudinal direction, wherein an energy absorption element comprises a deformation element which is connected to the supporting unit and to the holding unit by one fastening element in each case and which, during a relative displacement of supporting unit and holding unit in the event of a crash, is deformed, absorbing energy. According to the invention, it is provided that the energy absorption element comprises at least one predetermined breaking element which is fastened between the fastening elements.

The energy absorption element comprises a combination of a deformation element and a predetermined breaking element according to the previously described embodiments of the invention. In contrast to the prior art, the predetermined breaking element here is an integral part of the energy absorption element. As a result, the steering column can be manufactured and mounted more simply and more cost-effectively. The reliability and security are increased here.

FIGS. 1, 2 and 3 show a steering column 1, specifically in a perspective view obliquely forward from the side with respect to the direction of travel (FIG. 1), an enlarged detail of said view (FIG. 2) and a view from the same side this time rearward with respect to the direction of travel (FIG. 3).

The steering column 1 has an adjusting unit 2, with a sleeve unit 21 in which a steering spindle 22 is mounted rotatably about its longitudinal axis 23. A steering wheel (not illustrated here) can be mounted on a fastening portion 24 in the rear region of the steering spindle 22 with respect to the direction of travel.

For the fastening to a motor vehicle body (not illustrated), the steering column 1 has a holding unit 3. The holding unit 3 has a holding part 31 from which two side members 32 extend.

The sleeve unit 21 of the adjusting unit 2 is accommodated between the side members 32. A clamping spindle 4 extends through an opening transversely with respect to the longitudinal axis 23 in a box-shaped support element 25 attached to the sleeve unit 21 and passes through the two side members 32 in elongated holes 33 which extend in the vertical direction H transversely with respect to the longitudinal axis 23 and transversely with respect to the clamping spindle 4. The clamping spindle 4 is coupled to a clamping device known per se from the prior art, for example to a cam-type clamping device, a tilting-pin clamping device or the like, which is supported on the outside of one of the side members 32. The clamping device can be brought into a fixing position in which a clamping force is exerted on the side members 32 from the outside by the clamping spindle 4, as a result of which said side members are pulled together in relation to each other by the clamping spindle 4 and are braced in a frictionally locking manner with the side surfaces 26 of the sleeve unit 21. As a result, the sleeve unit 21 and, with the latter, the adjusting unit 2 are fixed relative to the vehicle body during the normal driving mode. If the clamping device is brought into a release position, the wedging or clamping force applied to the side surfaces 26 via the side members 32 is eliminated and therefore the frictional connection is released. As a result, the adjusting unit 2 can be adjusted in the elongated holes 33 in the side cheeks 32 in the vertical direction H relative to the holding unit 3, and therefore a height adjustment of the steering wheel can be undertaken, as is indicated by the double arrow in the drawing.

Rib-like projections 27 and 28 are in each case laterally arranged on the side surfaces 26 of the adjusting unit 2, i.e. protruding from the inside toward the side members 32, wherein the projection 27 is arranged on the support element 25, and the projection 28 is arranged on the sleeve unit 21, approximately level with the longitudinal axis 23 in the example shown. The projections 27 and 28 are arranged substantially parallel to each other at a distance in pairs and extend substantially parallel to the longitudinal axis 23. On their inner sides which face said side surfaces 26, the side members 32 likewise have projections which, in the example illustrated, are formed by beads 34 and 35 which are molded, for example by being pressed in, from the outside with respect to the sleeve unit 21 into the side members 32, which are preferably composed of steel sheet. The beads extend in the vertical direction H transversely with respect to the longitudinal axis 23 and therefore transversely with respect to said projections 27 and 28. In the example illustrated, they are not arranged parallel, but rather, as can be seen in the figures, at an angle to each other, and therefore, in an imaginary extension, would intersect at an intersection point 36 above the holding unit 3, as is indicated schematically by the dashed lines.

In the fixing position of the clamping device, the projections, which are formed by the beads 34 and 35, on the inner sides of the side members 32 are in contact with the projections 27 and 28 on the side surfaces 26, and therefore a four-point support is formed. By means of the parallel projections 27 and 28 and the beads 34 and 35 running at an angle to each other, a four-point-like wedging contact is realized, in which the four wedging points, at which in each case one of the projections 27 or 28 makes contact with one of the beads 34 or 35, form the corner points of a trapezoid. The clamping spindle 4 pierces the formed trapezoid surface vertically, i.e. is located within the surface region defined by the wedging points. During the fixing operation, the trapezoidal surface region of a side member 32, which is preferably manufactured from steel sheet, said surface region being bounded by the beads 34 and 35 and the projections 27 and 28, is elastically molded inward, i.e. directed in each case toward the side surface 26, by the clamping spindle 4. This gives rise to an interlocking connection between the projections 27 and 28 of the side members 32 and the side surfaces 26 with respect to a rotation about the clamping spindle 4. Consequently, the sleeve unit 21 of the adjusting unit 3 is particularly securely secured against rotation and displacement relative to the holding unit 3 in the fixing position, and therefore reliable vertical and longitudinal positioning of the steering wheel can be achieved by relatively low wedging forces.

The side members 32 and the sleeve unit 21 with the support element 25 are preferably formed from punched, bent and joined sheet-metal parts. As a result, the projections 27, 28, 34 and 35 can be designed as edges or beads molded into the metal sheet. Alternatively, the projections 27, 28, 34 and 35 can be realized by components additionally attached to the metal sheet, for example rails or profiles made of plastic or of another suitable material, which are latched, for example in the form of projection 28, into an opening in the wall of the sleeve unit 21 in an interlocking manner. Alternatively, instead of the beads 34 and 35, projections can be molded in some other manner from the inside onto the side members 32, for example in the form of webs or the like formed by welding on.

In order to realize a crash device, the holding part 31 has elongated holes 37 which extend parallel to the longitudinal axis 23 and through which fastening journals 5 are guided, said fastening journals being designed as a sliding capsule or sliding block and forming a supporting unit, which is fixedly connected to the body. The fastening journals 5 can be secured to a cross-member of the body by means of a bolt (not illustrated). In the crash situation, when the driver strikes against the steering wheel, a force acts forward in the longitudinal direction L on the adjusting unit 2, said force being greater than the static friction force between the fastening journal 5 and the holding part 31, and therefore the holding part 31 is moved forward relative to the body and therefore relative to the fastening journal 5, wherein each fastening journal 5 slides rearward with respect to the longitudinal direction L in the respective elongated hole 37.

An energy absorption element 6 according to the invention, as illustrated in various embodiments in FIGS. 4 to 8, is attached between the fastening journal 5 and the holding unit 3. In each of the embodiments which are illustrated by way of example, the energy absorption element 6 comprises a first fastening element 61 and a second fastening element 62 which are arranged at a distance from each other with respect to the longitudinal direction L of the longitudinal axis 23. The first fastening element 61 is fixedly connected to the body-mounted fastening journal 5 with respect to a loading parallel to the longitudinal axis 23 by a fastening opening 63, i.e. the fastening journal is guided through the fastening opening 63. The second fastening element 62 is fixedly connected to the holding part 31 of the holding unit 3 by means of a wedging or joining connection 38, for example by calking, riveting or welding.

A deformation element 64 is connected to the fastening elements 61 and 62, and therefore a relative movement of the fastening elements 61 and 62 leads to plastic deformation of the fastening element 64, as will also be explained further below.

Furthermore, according to the invention, a predetermined breaking element 7 is connected to the first fastening element 61 and to the second fastening element 62, and is therefore arranged parallel to the deformation element 64 with respect to a force F acting on the fastening elements 61 and 62.

Figure 5:
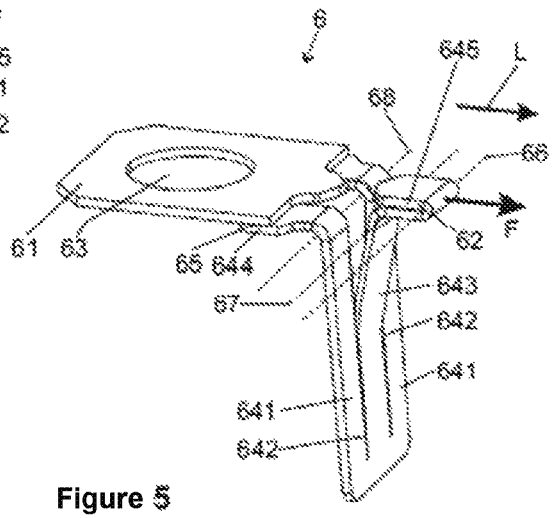
FIG. 5 is a schematic perspective view of the example energy absorption element of FIG. 4 in a triggered state.
Figure 6:
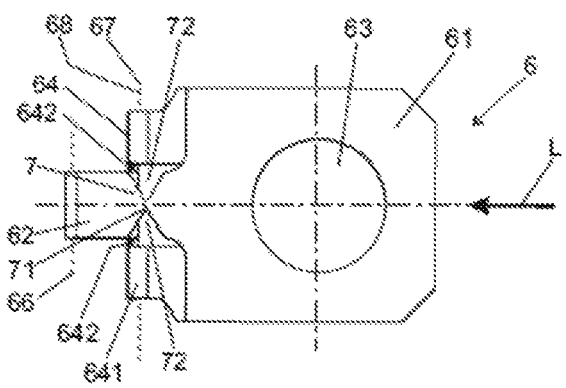
FIG. 6 is a top view perpendicular to a longitudinal axis of the example energy absorption element of FIG. 4.

In the embodiment illustrated in FIGS. 4, 5 and 6, the deformation element 64 is designed as a bending and tearing tab. The latter comprises a plate-like basic body 641 in which a bending strip, which is bounded by predetermined tearing lines 642, of a bending and tearing tab, synonymously called tearing tab 643 in short below, is formed. The predetermined tearing lines 642 form linear material weakenings in the basic body 641, said material weakenings being formed, for example, by notches.

Figure 7:
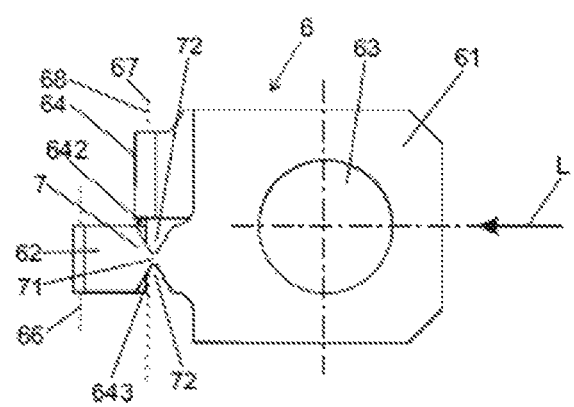
FIG. 7 is a top view perpendicular to a longitudinal axis of another example energy absorption element.
Figure 8:
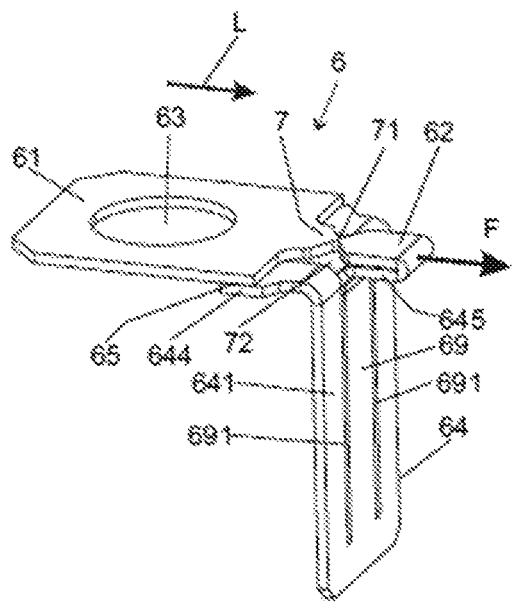
FIG. 8 is a schematic perspective view of still another example energy absorption element.

The basic body 641 extends transversely with respect to the longitudinal axis 23—downward in FIGS. 4, 5 and 8 or into the plane of the drawing in FIGS. 6 and 7—and, in a portion 644 which is angled in the direction of the longitudinal axis and is bent over by approximately 90° along a bending line 68 (indicated by dashed lines), is fixedly connected to the first fastening element 61 via a joining connection 65, for example a spot weld, a brazed connection, a riveted connection or a clinching connection. The tearing tab 643 is likewise angled with its free portion 645 in the direction of the longitudinal axis 23, and is fixedly connected to the second fastening element 62. In the embodiment illustrated, said second fastening element 62 is formed as a single piece in the form of a formed sheet-metal part by bending over along a bending line 67 (shown by dashed lines) of the tearing tab 643. The bending over is likewise approximately 90°.

The predetermined breaking element 7 according to the invention is attached between the first fastening element 61 and the second fastening element 62. In the example illustrated, said predetermined breaking element is of strip-shape design, for example in the form of a sheet-metal strip with a width as per the tearing tab 643. The predetermined breaking element 7 has a predetermined breaking point 71 which is realized, for example, by a material cross section which is reduced in comparison to the remaining extent of the predetermined breaking element 7.

In the embodiment illustrated, the predetermined breaking element 7 is formed as a single piece with the first fastening element 61, and likewise merges as a single piece into the second fastening element 62.

Furthermore, as illustrated, the predetermined breaking element 7 can be bent over at the free end of the second fastening elements 62 by 180° about a bending line 66 and can merge as a single piece into the tearing tab 643. The tearing tab 643 which is bent relative to the fastening element 62 about the bending line 67, by 90° in the example shown, likewise as a single piece together with the basic body 641 forms the deformation element 64. The basic body 641, after the bending over about the bending line 68, by 90° in the example illustrated, merges into the portion 644 which is fixedly connected to the first fastening element 61, for example via the joining connection 65 designed as a spot weld. An energy absorption element 6 according to the invention can therefore be produced as a bending/joining part from a single-piece sheet-metal blank, which permits particularly economical and cost-effective production in comparison to the prior art.

FIG. 4 shows the energy absorption element 6 in the intact original state, in which the two fastening elements 61 and 62 are connected to each other via the predetermined breaking element 7, and the deformation element 64 arranged parallel thereto is undeformed. The same state is illustrated in FIG. 6, wherein the view is undertaken from above parallel to the vertical direction H. It is clearly apparent therefrom that the predetermined breaking element 7 has the same width as the second fastening element 62 and the tearing tab 643. The reduced material cross section of the predetermined breaking point 71 is formed in said predetermined breaking element by two V-shaped recesses 72 which are introduced laterally into the extent of the predetermined breaking element 7.

FIG. 5 shows the energy absorption element 6 according to FIG. 4 in a triggered and partially deformed state after a crash situation. As described above, in such a crash situation, the holding part 31 moves forward in the longitudinal direction L parallel to the longitudinal axis 23 relative to the body-mounted fastening journal 5, also called sliding capsule or sliding block. As a result, a force F, namely a tensile force parallel to the longitudinal axis 23, is exerted on the second fastening element 62, which is connected to the holding part 31, relative to the first fastening element 61, which is connected to the fastening journal 5. If the force F exceeds a predetermined limit value, i.e. a limit force which occurs only in the crash situation when a body strikes against the steering wheel, the predetermined breaking element 7 is so greatly subjected to a tensile load that the predetermined breaking point 71 tears since the tensile strength of the material in the predetermined breaking element 7 is exceeded. Only then can the second fastening element 62 be moved relative to the first fastening element 61 in the direction of the force F parallel to the longitudinal axis 23. As a result, the tearing tab 643 is separated from the basic body 641 along the predetermined tearing lines 642 and at the same time bent away from the basic body 641, with the basic body 641 likewise being bent in itself. By means of the tearing and bending, the energy admitted into the adjusting unit 2 during the crash is continuously converted over the length of the predetermined tearing line 642 into deformation work, i.e. is absorbed.

Owing to the integration according to the invention of the predetermined breaking element 7, the tearing tab 643 can be separated and bent over, i.e. the deformation element 64 can be activated, only after the predetermined breaking element 7 has been broken or torn due to a limit force F being exceeded. In the event of loads below the threshold value, for example during operation of the steering wheel adjustment due to unauthorized use, the predetermined breaking element 7 is not destroyed and the deformation element 64 cannot be activated and therefore also cannot be damaged.

FIG. 7 shows an alternative embodiment of an energy absorption element 6 which is constructed similarly to the embodiment according to FIGS. 4 to 6, but in contrast thereto, comprises a tearing tab 643 connected merely on one side to the basic body 641 via a predetermined tearing line 642. Otherwise, the operation is identical.

The deformation element 64 of the embodiment illustrated in FIG. 8 substantially corresponds to the design shown in FIG. 4, with the difference that, instead of the tearing tab 643, a bending strip is provided in the form of a pure bending tab 69 which even in the original state is separated from the basic body 641 along the two separating lines 691, which form apertures, and therefore is not separated out in the crash situation, but rather is merely bent over. As a result, a differing energy absorption characteristic can be realized.

Figure 9:
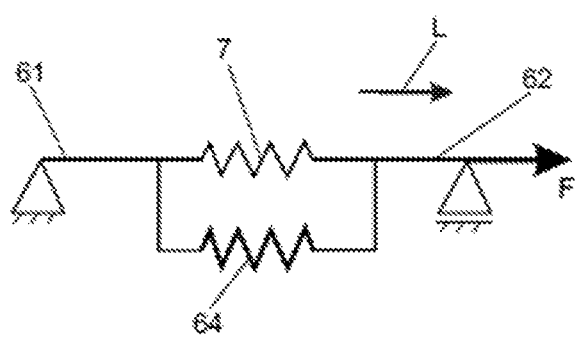
FIG. 9 is a circuit diagram of an example energy absorption element in an inoperative state.
Figure 10:
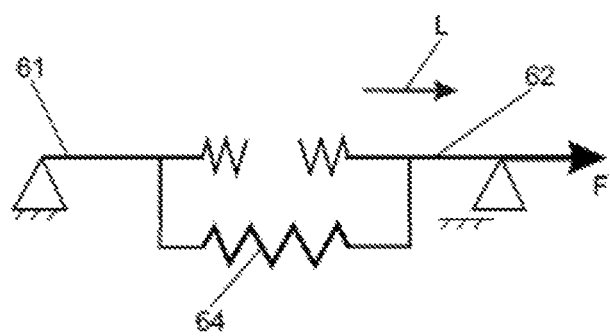
FIG. 10 is a circuit diagram of an example energy absorption element in a triggered state.

FIGS. 9 and 10 illustrate an equivalent circuit diagram of the energy absorption element according to the invention in the inoperative state and in the triggered state, wherein the first fastening element is coupled to a fixed bearing and the second fastening element is coupled to a movable bearing which is displaceable in the longitudinal direction. The predetermined breaking element 7 and the deformation element 64 are both symbolized as a spring, wherein said springs are connected in parallel. In the inoperative state, as illustrated in FIG. 9, the force flux between the first fastening element 61 and the second fastening element 62 takes place both via the predetermined breaking element 7 and via the deformation element 64 since, as already explained, the predetermined breaking element 7 and the deformation element 64 are arranged parallel to each other with respect to the force flux. In the triggered state, as in FIG. 10, the predetermined breaking element 7 has been broken by the limit force being exceeded or, in other words, is decoupled from the force flux, and therefore the force F only acts now on the deformation element 64 and, as a result, the shifting of the second fastening element 62 in the longitudinal direction L is deformed.

Figure 11:
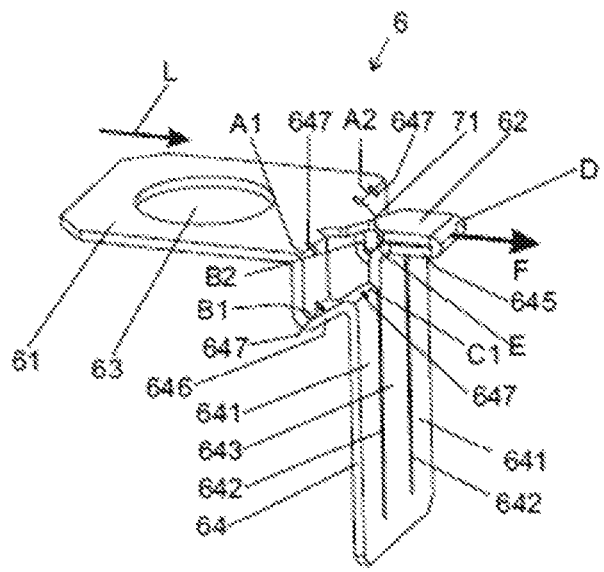
FIG. 11 is a top view perpendicular to a longitudinal axis of a still further example energy absorption element.

FIG. 11 illustrates an energy absorption element 6 according to the invention in a third embodiment in a perspective view, wherein said energy absorption element 6 is designed as a single-piece, integral component which is preferably formed as a single-piece punched and bent component. In other words, said energy absorption element manages without a joining connection present in the previously described embodiment. Said energy absorption element can therefore be manufactured by a punching and bending process without an additional further operation. The manufacturing preferably takes place in a four-stage process. As a result, the energy absorption element 6 according to the invention can be produced particularly economically. The energy absorption element 6 according to the invention comprises a first fastening portion 61 and a second fastening portion 62, wherein the predetermined breaking element 7 and the deformation element 64 is arranged between the fastening portions 61, 62. In this embodiment, a joining point is not provided between the first fastening portion 61 and the basic body 641 since a compensating portion 646 is provided between the first fastening portion 61 and the basic body 641, said compensating portion being deformed about the bending edges A1, B1, C1 and about the bending edges A2, B2, C2. In order to reinforce the compensating portion 646, at least one reinforcing bead 647 can preferably be introduced in the radius region of the compensating portion 646. This preferably takes place in the final deforming step which can also serve for calibrating the energy absorption element 6. The reinforcing bead 647 stiffens the compensating portion 646. An inadvertent deformation of the compensating portion 646 during the crash is thereby reduced.

Figure 12:
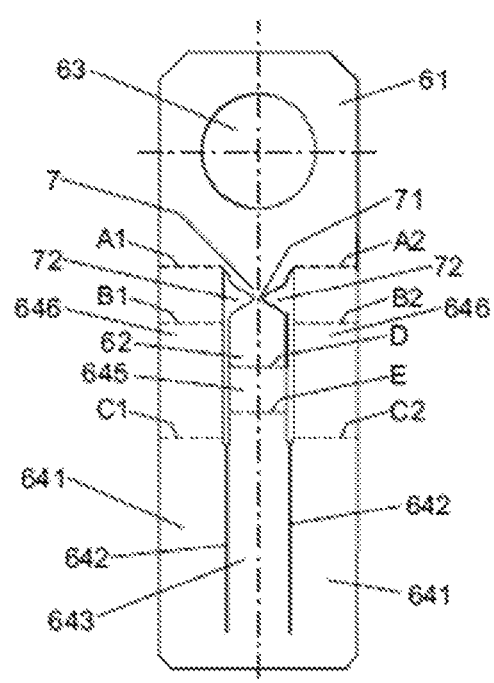
FIG. 12 is a top view, prior to a deforming operation, of a blank to be used in a manufacturing step to produce an example energy absorption element.

In order to form the second fastening portion 62, the material of the original plate is bent back about the bending edge D and therefore merges into the portion 645 and leads furthermore by means of the bending over about the bending edge E into the bending strip 643. On account of the configuration of the second fastening portion, it is therefore required to provide the compensating portion 646 between the first fastening portion 61 and the basic body 641 with the corresponding bending edges A1, B1, C1 or the bending edges A2, B2, C2 in order to provide a spatial compensation which is required because of the bent-back portion 645 of the second fastening portion 62. In order to clarify this better, the energy absorption element according to FIG. 11 is illustrated in a development in FIG. 12. This corresponds to the state of the plate between the manufacturing steps of the punching operation and the subsequent bending operations. It can readily be seen here that the energy absorption element according to the invention can be manufactured from a single-piece, integral sheet-metal part in which no additional joining connections are required.

The manufacturing steps listed below can be used for producing the energy absorption element according to the third embodiment:

punching the blank out of a metal sheet;

molding a V-shaped portion, consisting of the second fastening element 62 and the portion 645, in a tool mold, and, in the process, the two compensating portions 646 which are arranged on either side of the second fastening element 62 are pre-shaped in the opposite direction by means of a simple tool system;

chamfering the first fastening portion 61 at right angles to form the deformation element 64;

calibrating the energy absorption element during impressing of the final shape of the compensating portion 646 and of the U-shaped portion, consisting of the second fastening element 62 and the portion 645. The reinforcing beads 647 can preferably also be impressed at the same time.

In principle, it is conceivable and possible to combine further constructional forms (not cited here) of the deformation elements 64 with differing constructional forms of predetermined breaking elements 7 in the manner according to the invention without departing from the basic concept of the invention.

LIST OF REFERENCE SIGNS

1 Steering column
2 Adjusting unit
21 Sleeve unit
22 Steering spindle
23 Longitudinal axis
24 Fastening portion
25 Support element
26 Side surface
27, 28 Projection 3 Holding unit
31 Holding part
32 Side member
33 Elongated hole
34, 35 Bead
36 Intersecting point
37 Elongated holes
38 Joining connection
4 Clamping spindle
5 Fastening journal
6 Energy absorption element
61, 62 Fastening element
63 Fastening opening
64 Deformation element
641 Basic body
642 Predetermined tearing lines
643 Tearing tab (bending strip)
644 Portion
645 Portion
646 Compensating portion
647 Reinforcing beads
65 Joining connection
66, 67, 68 Bending line
69 Bending tab (bending strip)
691 Separating line
7 Predetermined breaking element
71 Predetermined breaking point
72 Recesses
H Vertical direction
L Longitudinal direction
F Force

What is claimed is:

1. An energy absorption element for a steering column of a motor vehicle, the energy absorption element comprising:
   a first fastening element;
   a second fastening element;
   a deformation element that is connected to the first fastening element and to the second fastening element, wherein the deformation element is disposed in a force flux with respect to a force that is configured to be exerted on the first fastening element relative to the second fastening element; and
   a predetermined breaking element connected to the first and second fastening elements parallel to the deformation element in the force flux;
   wherein the deformation element comprises at least one of a bending element, a tearing tab, or a bending and tearing tab; and
   wherein the deformation element comprises:
      a basic body that is attached to the first fastening element; and
      a bending strip formed on the basic body, wherein the bending strip is connected to the second fastening element.

2. The energy absorption element of claim 1 wherein the predetermined breaking element comprises a predetermined breaking point with a reduced breaking or tearing resistance relative to a remaining extent between the first and second fastening elements.

3. The energy absorption element of claim 1 wherein the first and second fastening elements are spaced apart from each other in a longitudinal direction, wherein the deformation element and the predetermined breaking element are disposed between the first and second fastening elements with respect to the longitudinal direction.

4. The energy absorption element of claim 1 wherein the deformation element is deformable in a continuously progressing manner over a predetermined deformation distance.

5. The energy absorption element of claim 1 wherein the energy absorption element is configured as a single-piece shaped part.

6. The energy absorption element of claim 1 wherein the energy absorption element is configured as a sheet-metal shaped part.

7. A steering column for a motor vehicle comprising:
   a supporting unit that is connectable to a body of the motor vehicle;
   a holding unit that supports an adjusting unit with a steering spindle mounted rotatably therein, the holding unit being held by the supporting unit so as to be displaceable in a longitudinal direction;
   an energy absorption element that includes a deformation element that is connected to the supporting unit by a first fastening element and to the holding unit by a second fastening element, wherein during a relative displacement of the supporting unit and the holding unit in a crash event the deformation element is deformed and absorbs energy, wherein the energy absorption element comprises a predetermined breaking element that is disposed between the first and second fastening elements,
   wherein the predetermined breaking element is connected to the first and second fastening elements parallel to the deformation element in a force flux with respect to a force that is configured to be exerted on the first fastening element relative to the second fastening element.

8. An energy absorption element for a steering column of a motor vehicle, the energy absorption element comprising:
   a first fastening element;
   a second fastening element;
   a deformation element that is connected to the first fastening element and to the second fastening element, wherein the deformation element is disposed in a force flux with respect to a force that is configured to be exerted on the first fastening element relative to the second fastening element;
   a predetermined breaking element connected to the first and second fastening elements parallel to the deformation element in the force flux; and
   wherein the first and second fastening elements are spaced apart from each other in a longitudinal direction, wherein the deformation element and the predetermined breaking element are disposed between the first and second fastening elements with respect to the longitudinal direction.

* * * * *